United States Patent [19]
Wiese

[11] 3,806,135
[45] Apr. 23, 1974

[54] COOLING SEAL
[75] Inventor: Winfred J. Wiese, Whittier, Calif.
[73] Assignee: Borg-Warner Corporation, Chicago, Ill.
[22] Filed: Oct. 4, 1972
[21] Appl. No.: 295,082

[52] U.S. Cl............ 277/15, 277/74, 277/93, 277/DIG. 8
[51] Int. Cl............................................ F16j 15/34
[58] Field of Search............... 277/3, 15, 16, 71, 74, 277/93, DIG. 8

[56] References Cited
UNITED STATES PATENTS
| | | | |
|---|---|---|---|
| 2,628,852 | 2/1953 | Voytech.............................. | 277/15 |
| 2,824,759 | 2/1958 | Tracy................................... | 277/15 |
| 3,028,181 | 4/1962 | Thompson et al.................. | 277/15 |
| 3,291,489 | 12/1966 | Tracy et al.......................... | 277/15 |

Primary Examiner—Louis R. Prince
Assistant Examiner—Robert I. Smith
Attorney, Agent, or Firm—Donald W. Banner

[57] ABSTRACT

A mechanical seal assembly for a motor or pump shaft having a cooling fluid flow passage, and wherein the mechanical sealing elements are disposed in a seal chamber which communicates with the flow passage, the seal elements define with the shaft, a cooling fluid flow path extending internally of the seal elements.

9 Claims, 1 Drawing Figure

PATENTED APR 23 1974                                              3,806,135
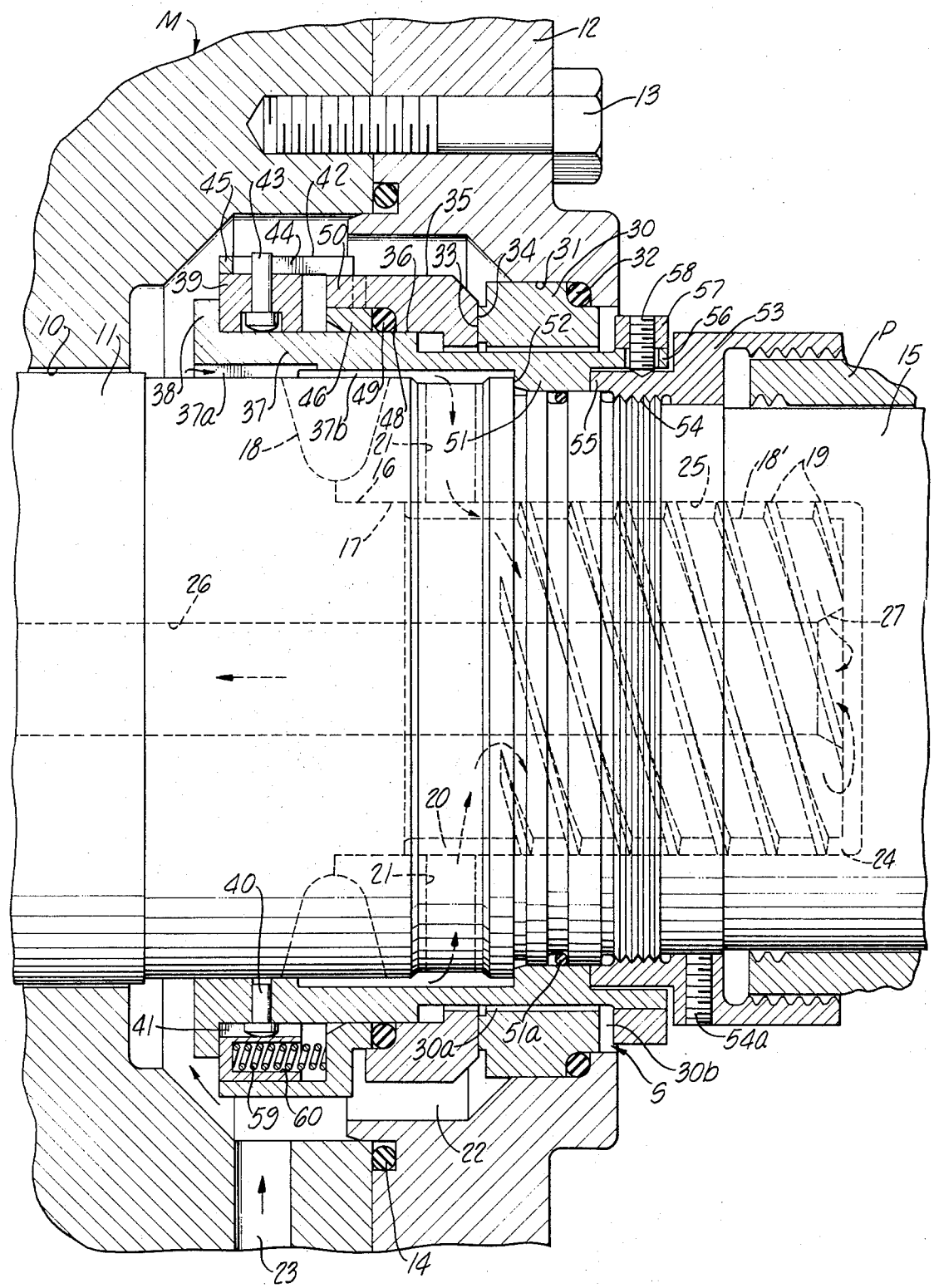

COOLING SEAL

BACKGROUND OF THE INVENTION

In the operation of certain motor and pump assemblies wherein the pumped fluid is at an elevated temperature or wherein the environment in which the motor is operating is hot, such as in the case of various "canned" motor - pump units which include a sealed motor - pump assembly containing an oil bath in the motor, it has been the practice to provide a cooling fluid circulating system for causing the flow of the oil in the motor through a cooling loop including a flow passage extending through the motor shaft from or adjacent to its juncture with the pump shaft. A mechanical seal has been employed to confine the cooling fluid in a seal chamber defined at the juncture of the motor housing and the pump housing. These prior seals have included a bellows and a pair of seal rings having companion radial sealing faces confining the cooling fluid in the seal chamber, one of the seal rings and the bellows being non-rotatable and the other seal ring bein rotatable with the motor shaft.

Such cooling seal assemblies, while being, in general satisfactory, have posed problems respecting their reliability due to variations in the bellows and complexity of assembly, disassembly and repair, and due to the cooling fluid being internally confined by the seal rings whereby the seal is subjected to pressure causing tensile stress in the seal rings.

SUMMARY OF THE INVENTION

The present invention provides a seal for motor - pump shaft cooling systems of the general type referred to above, but wherein the seal is reliable and is easy to assemble and disassemble. In addition, the seal of the present invention is so constructed and arranged that the cooling fluid pressure is applied externally, that is, to the outer periphery of the seal rings, so that the seal rings are under compressive force and therefore more reliable.

In accomplishing the foregoing, the present invention provides a stationary seal ring having a radial seal face and fixedly disposed in a seal flange so as to be exposed to atmosphere at its inner periphery about a supporting sleeve for a rotatable seal ring, the supporting sleeve being effectively connected to the shaft for rotation therewith and extending into a seal chamber which communicates with a cooling fluid passage in the shaft internally of the supporting sleeve. The rotatable seal ring has a radial seal face opposed to the seal face of the non-rotatable seal ring, so that cooling fluid is confined within the seal chamber and flows to the cooling fluid passage in the shaft. With such a construction, the supporting sleeve, with the rotatable and non-rotatable seal ring thereon is easily installed on the shaft and retained thereon by a retainer ring. Since the fluid pressure is applied externally or at the outer periphery of the seal rings and applies a compressive radial force thereto, the seal efficiency is enhanced.

This invention possesses many other advantages, and has other purposes which may be made more clearly apparent from a consideration of a form in which it may be embodied. A form is shown in the drawing accompanying and forming part of the present specification. It will now be described in detail, for the purpose of illustrating the general principles of the invention; but it is to be understood that such detailed description is not to be taken in a limiting sense, since the scope of the invention is best defined by the appended claims.

BRIEF DESCRIPTION OF THE DRAWING

The single view of the drawing is a fragmentary view partly in longitudinal section and partly in elevation, showing a seal according to the present invention applied to a shaft of a motor-pump assembly.

DESCRIPTION OF THE PREFERRED EMBODIMENT

As seen in the drawing a motor housing M has a shaft opening 10 in which is rotatably disposed a motor shaft 11. Affixed to the motor housing M is a typical mechanical seal flange 12, secured in place by a suitable number of screw fasteners 13 and having a suitable ring seal 14 to prevent leakage between the motor housing M and seal flange 12. In the present illustration, the motor shaft 11 is joined to a reduced diameter pump shaft 15 which is rotatably disposed within a pump housing P. The present invention is not concerned with the details of the Motor M or the pump P and therefore only the adjacent portions of the respective housings are herein illustrated, and the illustrated structure is substantially conventional, including the manner in which the motor shaft 11 is joined to the pump shaft 15 and the manner in which cooling fluid is circulated through the motor shaft 11, as will be later described.

More particularly, however, the motor shaft 11 has a reduced end portion 16 which is disposed within a bore 17 of the pump shaft 15, and the shafts are interconnected by suitable means, such as a weld designated 18. The reduced end portion 16 of the motor shaft 11 is provided with a further reduced section 18' having helical ribs 19 thereon extending between the end extremity of the reduced section 18' and an annular space or fluid passage 20 between the end section 18' of the motor shaft and the reduced section 16 thereof. The pump shaft 15 has a suitable number of radial ports 21 which communicate with the annular space 20 and with the seal chamber 22 which is defined between the shaft assembly and the motor housing M and the seal flange 12.

A cooling fluid such as oil is adapted to be supplied to the seal chamber 22 through a suitable inlet port 23 in the motor housing M, leakage of such cooling oil from the chamber 22 between the seal flange 12 and the pump shaft 15 being prevented by a mechanical seal assembly S, hereinafter to be described. However, the flange 12 may have the inlet port, or fluid passage, opening into the seal chamber 22, through which cooling fluid may be supplied to the seal chamber. The cooling oil entering the seal chamber 22 is adapted to flow, via the ports 21 in the pump shaft 15, into the annular space 20 and thence between the helical ribs 19 through the annular space 24 defined between the reduced end 18' of the motor shaft 11 and the pump shaft bore 25 into which the motor shaft end 18' extends. Extending longitudinally through the motor shaft 11 is a coolant fluid passage 26 having an opening 27 at its end which opens in the bore 25, whereby fluid flowing between the helical ribs 19 finds access to the longitudinally extended passage 26. The passage 26, as is well known may lead to the motor shaft thrust bearings in an axially spaced remote location, so as to cool the latter, and due to the path of circulation of the cooling fluid, which is supplied from a suitable pumping source, between the helical ribs 19, the contiguous portions of the pump shaft 15 are also effectively cooled, so that if the pump is handling hot fluids, then the heat is prevented from transferring through the shaft connection to the motor.

The general assembly, as thus fair described, is substantially conventional in so called canned motors, wherein the cooling fluid or oil is re-circulated through the motor shaft to perform its cooling function. The present invention relates to the novel seal assembly S in such a motor pump assembly.

The present seal assembly S includes a non-rotatable seal ring 30 disposed within a bore 31 in the seal flange 12, with a suitable resilient sealing ring 32 interposed between the flange 12 and the seal ring 31 to prevent leakage about the exterior of the seal ring 30. The seal ring 30 has a radially extended flat seal face 33 opposed by a companion radial flat sealing face 34 of a rotatable seal ring 35 which is adapted to rotate with the shaft and to be biased axially by fluid pressure toward the non-rotatable seal ring 30 to control leakage between the opposed seal faces 33 and 34, as is typical in mechanical seals.

The rotatable seal ring 35 is supported at its inside diameter on a cylindrical shoulder or balance portion 36 of a supporting sleeve 37, which, as will be later described, is mounted upon the shaft assembly for rotation therewith. The supporting sleeve 37 has an inner end flange 38 projecting radially outward and constituting an abutment engageable by a drive ring 39 which is pinned or otherwise suitably connected to the supporting sleeve 37 by means of one or more circumferentially spaced pins 40 which engage in elongated slots 41 in the drive ring 39, whereby rotation of the supporting sleeve 37 is transmitted to the drive ring 39, but the drive ring 39 can be assembled end-wise over the balance portion 36 of the supporting sleeve 37.

The drive ring 39 is also adapted to drive a seal carrier ring 42, by means of suitable drive pins 43 carried by the drive ring 39 and projecting radially outwardly into longitudinally extended slots 44 in an outer cylindrical portion 45 of the carrier ring 42. The carrier ring 42 has an inner cylindrical portion 46 slidably disposed upon the balance portion 36 of the supporting sleeve 37, and projecting into an annular peripheral groove 48 in the rotatable seal ring 35, in which is disposed a suitable resilient sealing ring 49, adapted to form a seal between the supporting sleeve 37 and the rotatable seal ring 35, whereby cooling fluid or oil in the seal chamber 22 may not escape therebetween. A suitable number of longitudinally extended and circumferentially spaced drive lugs 50 on the rotatable seal ring 35 are engaged in the slots 44 of the seal carrier ring 42, whereby rotation of the carrier ring 42 is transmitted to the rotatable seal ring 35.

In order to connect the seal supporting sleeve 37 to the shaft assembly, while at the same time facilitating assembly of the seal assembly S within the seal chamber 22, the seal supporting sleeve has an internal flange 51 adapted to abut with a radially outwardly projecting shoulder 52 on the shaft assembly, in the embodiment shown on the pump shaft 15. Engaged between the shaft and the flange 51 is a sealing ring 51a which prevents leakage of cooling fluid between the shaft and supporting sleeve 37. The supporting sleeve 37 is retained in place, with the internal flange 51 abutting with the shoulder 52, by a retainer sleeve 53 which is suitably threaded at 54 onto the pump shaft 15 and locked in place by a set screw 54a, and which has an end section 55 adapted to abut with the supporting sleeve flange 51 to hold it against the shaft shoulder 52. An end portion 56 of the supporting sleeve 37 extends axially through the non-rotatable seal ring 30 and has an outside diameter smaller than the inside diameter of the non-rotatable seal ring 30 and smaller than the inside diameter of the rotatable seal ring 35, as well as the drive and carrier rings 39 and 42, whereby the seal components may be installed end-wise upon the supporting sleeve 37, and thereafter retained in place against displacement from the supporting sleeve 37 by means of a retainer ring 57 suitably affixed to the supporting sleeve portion 56 by one or more set screws 58. This retainer ring 57 maintains the various components previously described in assembly and against being moved end-wise along the supporting sleeve 37 before assembly within the seal chamber, so that a suitable number of coiled compression springs 59, seating in bores 42, are retained in place. These springs 59 are employed to provide initial sealing contact between the seal faces 33 and 34.

It will be apparent that when the seal flange 12 is removed from the motor housing M, the entire rotatable component of the seal assembly S can be removed endwise, to the right as seen in the drawing for removal from the shaft assembly and replacement rotatable seal assemblies may be easily installed.

In addition it will be noted that the seal chamber 22 communicates with the ports 21, and thence with the cooling fluid passageway 26 in the shaft assembly, through a passage 37a defined between the inside diameter of the supporting sleeve 37 and the outside diameter of the shaft assembly, formed as elongated slots in the inside wall of the supporting sleeve 37, and then via an annular space 37b defined between the supporting sleeve 37 and the shaft assembly. Leakage of cooling fluid from the seal chamber at a controlled rate, typical of mechanical seals, will result in small quantities of oil or other cooling fluid passing between the seal rings 30 and 35 and into an internal annular space 30a between the non-rotatable seal ring 30 and the supporting sleeve 37, and thence to a radial gap 30b defined between the retainer ring 57 and the end of the non-rotatable seal ring 30, so that as rotation of the supporting sleeve 37 occurs such leakage will be thrown radially outwardly by centrifugal force and thereby not drain into the pump housing P, which in the presence of hot pump fluids may be so hot as to cause coking, for example, in the case of cooling oil.

In addition, inasmuch as the pressure of cooling fluid within the seal chamber 22 is applied to the outer peripheries or the outside diameters of the seal rings 30 and 35, the seal rings are subjected to a compressive force and are thereby more effective in their sealing action, than is the case when seal rings are subjected to the pressure of fluid being sealed at the inside diameters of the seal rings.

From the foregoing it will be apparent that the present invention provides a simple seal assembly adapted for use in cooling systems for motor pump assemblies, wherein the seal assembly may be readily installed and removed and wherein the seal assembly is more effective and reliable in that the pressure of cooling fluid is applied in such a manner as to maintain the seal rings under compression.

I claim:

1. In a mechanical sealing assembly; a housing having a shaft opening, a shaft rotatable in said opening, a seal flange on said housing and also having a shaft opening in which said shaft is rotatable, said housing, said flange and said shaft defining a seal chamber, said shaft having a fluid passage opening into said seal chamber, one of said housing and flange having a fluid passage opening into said seal chamber, said mechanical sealing means in said seal chamber for confining fluid in said chamber to a flow path between said fluid passages: the improvement wherein said mechanical sealing means includes a non-rotatable seal ring carried by said flange and encircling said shaft in circumferentially spaced relation to said shaft, a rotatable seal ring in said chamber, said seal rings having opposed sealing faces extending radially, and supporting means supporting said rotatable seal ring in said chamber and connecting said rotatable seal ring to said shaft for rotation therewith, said supporting means and said shaft defining a flow path therebetween communicating between said fluid passages.

2. In a mechanical sealing assembly as defined in claim 1, said housing having said fluid passage opening into said seal chamber.

3. In a mechanical sealing assembly as defined in claim 1, said supporting means supporting said rotatable seal ring in said chamber comprising a sleeve disposed about said shaft, and means connecting said sleeve to said shaft.

4. In a mechanical sealing assembly as defined in claim 1, said supporting means supporting said rotatable seal ring in said chamber comprising a sleeve disposed about said shaft, and means connecting said sleeve to said shaft, said sleeve having an enlarged diameter portion supporting said rotatable seal ring thereon, and including sealing ring means between said enlarged diameter portion and said rotatable seal ring to prevent passage of fluid therebetween.

5. In a mechanical sealing assembly as defined in claim 1, said supporting means supporting said rotatable seal ring in said chamber comprising a sleeve disposed about said shaft, and means connecting said sleeve to said shaft, said sleeve having an enlarged diameter portion supporting said rotatable seal ring thereon, and including sealing ring means between said enlarged diameter portion and said rotatable seal ring to prevent passage of fluid therebetween, and drive means for rotating said rotatable seal ring with said sleeve.

6. In a mechanical sealing assembly as defined in claim 1, said supporting means supporting said rotatable seal ring in said chamber comprising a sleeve disposed about said shaft, and means connecting said sleeve to said shaft, said sleeve having an enlarged diameter portion supporting said rotatable seal ring thereon, and including sealing ring means between said enlarged diameter portion and said rotatable seal ring to prevent passage of fluid therebetween, and drive means for rotating said rotatable seal ring with said sleeve while enabling limited longitudinal movement of said rotatable seal ring with respect to said sleeve and said non-rotatable seal ring.

7. In a mechanical sealing assembly as defined in claim 1, said supporting means supporting said rotatable seal ring in said chamber comprising a sleeve disposed about said shaft, and means connecting said sleeve to said shaft, said sleeve having an enlarged diameter portion supporting said rotatable seal ring thereon, and including sealing ring means between said enlarged diameter portion and said rotatable seal ring to prevent passage of fluid therebetween, and drive means for rotating said rotatable seal ring with said sleeve while enabling limited longitudinal movement of said rotatable seal ring with respect to said sleeve and said non-rotatable seal ring, and spring means for biasing said rotatable seal ring towards said non - rotatable seal ring.

8. In a mechanical sealing assembly as defined in claim 1, said supporting means supporting said rotatable seal ring in said chamber comprising a sleeve disposed about said shaft, and means connecting said sleeve to said shaft including a shoulder on said shaft, and a connector sleeve threadedly connected to said shaft and engaged with said supporting sleeve to force said supporting sleeve against said shoulder.

9. In a mechanical sealing assembly as defined in claim 1, said supporting means supporting said rotatable seal ring in said chamber comprising a sleeve disposed about said shaft, and means connecting said sleeve to said shaft including a shoulder on said shaft, and a connector sleeve threadedly connected to said shaft and engaged with said supporting sleeve to force said supporting sleeve against said shoulder, and means interconnecting said supporting sleeve and said connector sleeve against relative rotation.

* * * * *

UNITED STATES PATENT OFFICE
CERTIFICATE OF CORRECTION

Patent No. 3,806,135　　　　　　　Dated April 23, 1974

Inventor(s) Winfred J. Wiese

It is certified that error appears in the above-identified patent and that said Letters Patent are hereby corrected as shown below:

Column 5, line 10, before "flange" insert -- said --.

line 11, "said", second occurrence, should be deleted.

Signed and sealed this 29th day of October 1974.

(SEAL)
Attest:

McCOY M. GIBSON JR.　　　　　　　C. MARSHALL DANN
Attesting Officer　　　　　　　　Commissioner of Patents